United States Patent
Takamura

(10) Patent No.: US 7,493,360 B2
(45) Date of Patent: Feb. 17, 2009

(54) METHOD OF AND COMPUTER PROGRAM FOR CLIENT CHARACTER CODE CONVERSION, METHOD OF AND COMPUTER PROGRAM FOR SERVER CHARACTER CODE CONVERSION, CORBA CLIENT, AND CORBA SERVER

(75) Inventor: Naohiko Takamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 10/460,553

(22) Filed: Jun. 12, 2003

(65) Prior Publication Data

US 2003/0233484 A1 Dec. 18, 2003

(30) Foreign Application Priority Data

Jun. 14, 2002 (JP) .............................. 2002-174993

(51) Int. Cl.
G06F 15/16 (2006.01)
(52) U.S. Cl. .................. 709/203; 709/217; 709/223; 709/227; 709/246; 717/108
(58) Field of Classification Search ................ 709/203, 709/217, 223, 227, 246; 717/108
See application file for complete search history.

(56) References Cited

U.S. PATENT DOCUMENTS

| 6,282,579 B1* | 8/2001 | Carre .......................... 719/313 |
| 6,330,598 B1* | 12/2001 | Beckwith et al. ............ 709/223 |
| 6,529,947 B1* | 3/2003 | Feuerman .................... 709/217 |
| 6,718,389 B2* | 4/2004 | Navarre et al. .............. 709/227 |
| 6,732,167 B1* | 5/2004 | Swartz et al. ................ 709/223 |
| 6,842,771 B2* | 1/2005 | Lansio et al. ................ 709/203 |
| 7,111,077 B1* | 9/2006 | Starkovich et al. .......... 709/246 |
| 7,228,346 B1* | 6/2007 | Allavarpu et al. ............ 709/223 |

FOREIGN PATENT DOCUMENTS

| JP | 63-137348 | 6/1988 |
| JP | 09-305419 | 11/1997 |
| JP | 2001-167059 | 6/2001 |

OTHER PUBLICATIONS

Matsui Akira. Large Kanji characters BTRON specification OS "Ultra Kanji." Tronware. vol. 10, No. 5, Japan, Personal Media Corp., vol. 10, No. 5, pp. 33, Oct. 10, 1999.

* cited by examiner

*Primary Examiner*—Jinsong Hu
(74) *Attorney, Agent, or Firm*—Greer, Burns & Crain, Ltd.

(57) ABSTRACT

When converting client character code on a CORBA client in a client-server system that is based on common object request broker architecture, server character code information which a CORBA server as a transmission destination can use is obtained from an object reference. The client character code information is then converted into the server character code information. The server character code information is set to communication data that is transmitted from the CORBA client to the CORBA server. The conversion of client character code information into the server character code information is performed based on a table containing relationship between the server character code information and client character code information that the CORBA client can use and that is not registered in the object reference.

8 Claims, 14 Drawing Sheets

FIG.14

| CHARACTER CODE SET | CODE SET REGISTRY | REMARKS |
|---|---|---|
| ISO8859-1(Latin-1) | 0x00010001 | STANDARD CHARACTER CODE SET (ISO IS STANDARDIZED) |
| ISO/IEC 10646-1UCS2-1 | 0x00010100 | |
| ISO/IEC 10646-1UCS4-1 | 0x00010104 | |
| JIS | 0x00030001 | STANDARD CHARACTER CODE SET (JIS IS STANDARDIZED) |
| JIS JAPANESE EUC | 0x00030010 | |
| JIS FOR COMPANY B | 0x05000011 | VENDOR SPECIFIC CHARACTER CODE SET (COMPANY B'S OWN) |
| PART ONE OF JAPANESE EUC FOR COMPANY A | 0x10040001 | VENDOR SPECIFIC CHARACTER CODE SET (COMPANY A'S OWN) |
| PART TWO OF JAPANESE EUC FOR COMPANY A | 0x10040002 | |
| JAPANESE JIS FOR COMPANY A | 0x10040003 | |
| PART ONE OF EBCDIC FOR COMPANY A | 0x10040004 | |
| PART TWO OF EBCDIC FOR COMPANY A | 0x10040005 | |
| PART THREE OF EBCDIC FOR COMPANY A | 0x10040006 | |

METHOD OF AND COMPUTER PROGRAM FOR CLIENT CHARACTER CODE CONVERSION, METHOD OF AND COMPUTER PROGRAM FOR SERVER CHARACTER CODE CONVERSION, CORBA CLIENT, AND CORBA SERVER

BACKGROUND OF THE INVENTION

1) Field of the Invention

The present invention relates to methods and computers programs for conversion of client character code and server character code employed in CORBA (common object request broker architecture), CORBA client, and CORBA server. The present invention relates, more particularly, to carrying out a conversion of character code information with character code information (such as a vendor specific character code set) not registered in an object reference.

2) Description of the Related Art

CORBA is a standardization specification used to connect between different types of computers. CORBA is established by the standardization organization OMG (Object Management Group). CORBA prescribes various kinds of APIs (Application Program Interfaces) to build up a linked protocol between different types of computers, and a distributed application.

In short, CORBA is a standardization technique that provides a mechanism for a client that is based on CORBA (hereinafter, "CORBA client") to make access to an object (for example, an application program) within a server that is based on CORBA (hereinafter, "CORBA server") in a distributed system environment.

The object in CORBA refers to an entity that is identifiably encapsulated to provide one or a plurality of services that clients can request.

FIG. 13 is a block diagram of a configuration of a conventional client-server system based on CORBA. As shown in FIG. 13, a CORBA client 10 has a client object 11 and a client ORB (Object Request Broker: a mechanism of communications between distributed objects) 12. The client object 11 is an application program or the like that is used to execute various kinds of processing and communications.

The client ORB 12 is a software bus that intermediates between the client object 11 and the server object 31 in their communications. The client ORB 12 accesses a naming service server 50 and a CORBA server 30 via a network 20.

The client ORB 12 can communicate with a server ORB 32 via the network 20, by using neutral stream-format data, that is GIOP (General Inter-ORB Protocol) message 40, that does not depend on a specific operating system, a specific program language, or a specific architecture. The GIOP message 40 will be described in detail at later stage.

The CORBA server 30 includes a server object 31 and the server ORB 32. The server object 31 is an application program or the like that is used to execute various kinds of processing and communications. The server ORB 32 is a software bus accessed by the client ORB 12 via the network 20 and intermediates between the client object 11 and the server object 31 in their communications.

The server ORB 32 can also communicate with the client ORB 12 via the network 20, by using the neutral stream-format data, that is, the GIOP message 40, that does not depend on a specific operating system, a specific program language, or a specific architecture.

In the client-server system that is based on CORBA, a difference between operating systems, a difference between platforms, or a difference between program development languages appears as a difference between character code systems that can be handled. Many character code sets and code set registries are known currently as character code systems. Some of the character code systems are shown in FIG. 14.

A character code set is a set of character codes that are provided based on a constant standard. The character code is an identification number attached to a character that is handled in a computer. A code set registry is a value for uniquely specifying a corresponding character code set.

As shown in FIG. 14, ISO8859-1 (Latin-1), ISO/IEC 10646-IUCS2-1, and ISO/IEC 10646-IUCS4-1 are character code sets that are standardized by ISO (International Organization for Standardization). JIS and JIS Japanese EUC are character code sets that are standardized by JIS (Japan Industrial Standard).

As the above character code sets are standardized by public organizations such as ISO and JIS, these character code sets will be referred to as standard character code sets. These standard character code sets and code set registries are integrally managed by OSF (Open Software Foundation) as an international standardization organization, and are included in an object reference that is stored in an object reference database 51.

Apart from the standard character code sets, the character code sets include vendor specific character code sets. The vendor specific character code sets are character codes that the vendors add based on the standard character code sets. In other words, the vendor specific character code sets are character code sets are specific to each vendor. The vendors are the manufacturers or marketers of computer hardware or software.

With reference to FIG. 14, JIS for company B means a vendor specific character code set that is used by a vendor company B. On the other hand, a part one of Japanese EUC for company A, a part two of Japanese EUC for company A, . . . , and EBCDIC (English small letters) for company A are vendor specific character code sets used by a vender company A.

A character code system depends on the operating systems that are used in the CORBA client 10 and the CORBA server 30. Therefore, vendors and operating systems, and platforms and program development languages may be different for the CORBA client 10 and the CORBA server 30. It is not rare that their respective character code systems are different.

In the example shown in FIG. 14, the CORBA client 10 uses JIS (0x00030001) as a standard character code set for a client NCS (Native Code Set). On the other hand, the CORBA server 30 uses ISO/IEC 10646-1UCS2-1 (0x00010100) as a standard character code for a server NCS, and uses JIS (0x00030001) as a standard character code set for a CCS (Conversion Code Set).

When the CORBA client 10 and the CORBA server 30 use different standard character codes sets (and code set registries), the CORBA client 10 and the CORBA server 30 exchange information required for the code set conversion.

Referring back to FIG. 13, the client NCS in the CORBA client 10 is a code set registry (i.e., a character code set) that is used in the client object 11.

The server NCS in the CORBA server 30 is a code set registry (i.e., a character code set) that is used in the server object 31. The CCS is a code set registry (i.e., a character code set) that can be converted between the server NCS and the CCS.

The client ORB 12 and the server ORB 32 exchange the GIOP message 40 as neutral data between them. The GIOP message 40 is formatted as shown in FIG. 15. The format of the GIOP message includes information of a GIOP header, a request header, and a request body. The request header includes information of request_id (request ID), response_flags (response flags), target, operation, and service_context. The service_context includes information of context_id, contex_data length, and TCS (Transmission Code Set). TCS is a neutral code set registry (i.e., a character code set) that does not depend on a specific operating system, a specific program language, or a specific architecture.

Referring back to FIG. 13, the naming service server 50 provides the CORBA client 10 with a naming service of CORBA, and has a function of managing the server object 31 based on a name.

Based on this naming service, when the client object 11 accesses the server object 31, the client object 11 can access the server object 31 based on a name of the server object 31 instead of a position of the server object 31. Therefore, the client object 11 does not need to be conscious about a physical position of the server object 31.

Specifically, when the naming service server 50 receives an inquiry from the client object 11, the naming service server 50 reads an object reference from the object reference database 51, and returns this object reference to the client object 11, thereby to provide a naming service.

The object reference is information for uniquely identifying the server object 31 based on a name. Specifically, the object reference consists of information including an IOR (Interoperable Object Reference) header, an ID (Identification), a host name, a PORT number, an object key, the server NCS, and the CCS.

The IOR header is header information of the object reference. The ID is identifier information for identifying the object reference. The host name is a name of a host that has an object. An IP address of the CORBA server 30 may be set to the host name as it is.

The PORT number is a port number that specifies the server object 31. Vendor own information corresponding to the server ORB is set to the object key. Therefore, in the case of FIG. 13, vendor own information corresponding to the server ORB 32 is set to the object key.

The client ORB 12 determines the TCS based on the server NCS and the CCS obtained from the object reference, embeds this TCS into the GIOP message 40, and transmits the message to the server ORB 32.

The code conversion negotiation that is carried out in the client-server system will be explained next. In FIG. 13, the client object 11 accesses the naming service server 50 via the network 20, and requests the naming service server 50 for an object reference (including the server NCS and the CCS) corresponding to the server object 31.

Based on this, the naming service server 50 reads the object reference from the object reference database 51, and transmits this object reference to the client object 11.

The client object 11 obtains the object reference, and delivers transmission data corresponding to the client NCS (0x0003001 (JIS)) and the obtained object reference to the client ORB 12.

The client ORB 12 obtains the server NCS (0x00010100 (ISO/IEC 10646-1UCS2-1) and the CCS (0x00030010 (JIS) from the object reference.

The client ORB 12 executes a TCS determination processing of determining the TCS to be set to the GIOP message 40, based on a result of a comparison between the client NCS (0x00030010 (JIS)) and the server NCS (0x00010100 (ISO/IEC 10646-1IUCS2-1) and the CCS (0x00030010 (JIS).

Specifically, at a first step, the client ORB 12 decides whether the client NCS (0x00030001 (JIS)) coincides with the server NCS (0x00010100 (ISO/IEC 10646-1UCS2-1). In this example, the client ORB 12 sets "No" as a result of the comparison carried out. When a result of the comparison carried out at the first step is "Yes", the client ORB 12 determines the server NCS as the TOS.

When a result of the decision made at the first step is "No", the client ORB 12 decides at a second step whether the client NCS (0x00030001 (JIS)) coincides with the CCS (0x00030001 (JIS)). In this example, the client ORB 12 sets "Yes" as a result of the comparison carried out, and determines the CCS as the TCS. When a result of the comparison carried out at the second step is "No", it is not possible to carry out the conversion of the code sets. In this case, an error occurs.

The client ORB 12 sets the TCS determined in the TCS determination processing and the transmission data, to the GIOP message 40, and transmits the GIOP message 40 to the server ORB 32 via the network 20.

The server ORB 32 receives the GIOP message 40. When the TCS set in the GIOP message 40 coincides with the server NCS, the server ORB 32 uses the TCS as the server NCS, and delivers the reception data (i.e., the transmission data that is received) and the server NCS to the server object 31.

On the other hand, when the TCS set in the GIOP message 40 coincides with the CCS, the server ORB 32 converts the TCS (i.e., the CCS) into the server NCS, and delivers the reception data and the server NCS to the server object 31.

As explained above, according to the conventional client-server system based on CORBA, the system works without any problem based on the conversion of the character code sets, when both the CORBA client 10 and the CORBA server 30 use the standard character code sets.

However, conventionally, when vendor specific character code sets are used in place of the standard character code sets and also when the vendor specific character code sets (i.e., character code information) are not registered in the object reference, the other party recognizes the vendor specific character code sets (i.e., character code information) as unknown character codes sets (i.e., character code information). Therefore, in this case, there has been a problem that an error occurs in the system.

SUMMARY OF THE INVENTION

It is an object of the present invention to solve at least the problems in the conventional technology.

The CORBA client in a client-server system that is based on common object request broker architecture according to one aspect of the present invention includes an obtaining unit that obtains server character code information which a CORBA server as a transmission destination can use, from an object reference; a converting unit that converts the client character code information into the server character code information; and a setting unit that converts the server character code information to communication data that is transmitted from the CORBA client to the CORBA server. The converting unit performs the conversion by referring to a table containing a relationship between the server character code information and client character code information that the CORBA client can use and that is not registered in the object reference.

The CORBA client in a client-server system that is based on common object request broker architecture according to another aspect of the present invention includes an obtaining unit that obtains server character code information set by a CORBA server, from communication data received from the CORBA server; and a converting unit that converts the server character code information into client character code information. The converting unit performs the conversion by referring to a table containing a relationship between the server character code information and client character code information that the CORBA client can use and that is not registered in an object reference.

A method for conversion of client character code employed in a CORBA client in a client-server system that is based on common object request broker architecture according to still another aspect of the present invention includes obtaining server character code information which a CORBA server as a transmission destination can use, from an object reference; converting the client character code information into the server character code information; and setting the server character code information to communication data that is transmitted from the CORBA client to the CORBA server. The converting is performed by a table containing relationship between the server character code information and client character code information that the CORBA client can use and that is not registered in the object reference.

A method for conversion of client character code employed in a CORBA client in a client-server system that is based on common object request broker architecture according to still another aspect of the present invention includes obtaining server character code information set by a CORBA server, from communication data received from the CORBA server; and converting the server character code information into a client character code information. The converting is performed by referring to a table containing a relationship between the server character code information and client character code information that the CORBA client can use and that is not registered in an object reference.

A CORBA server in a client-server system that is based on common object request broker architecture according to still another aspect of the present invention includes an obtaining unit that obtains client character code information set by a CORBA client, from communication data received from the CORBA client; and a converting unit that converts the client character code information into the server character code information. The converting unit performs the conversion by refering to a table containing a relationship between client character code information that the CORBA client can use and that is not registered in an object reference and the server character code information that the CORBA server can use.

The method for conversion of server character code on a CORBA server in a client-server system that is based on common object request broker architecture according to still another aspect of the present invention includes obtaining client character code information set by a CORBA client, from communication data received from the CORBA client; and converting the client character code information into server character code information. The converting is performed by referring to a table containing a relationship between client character code information that the CORBA client can use and that is not registered in an object reference and server character code information that the CORBA server can use.

The computer programs according to the present invention realize the methods according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 14 shows a list of character code set/code set registries; and

DETAILED DESCRIPTION

Exemplary embodiments of methods and computers programs for conversion of client character code and server character code according to the present invention will be explained below with reference to the accompanying drawings.

Figure 1:
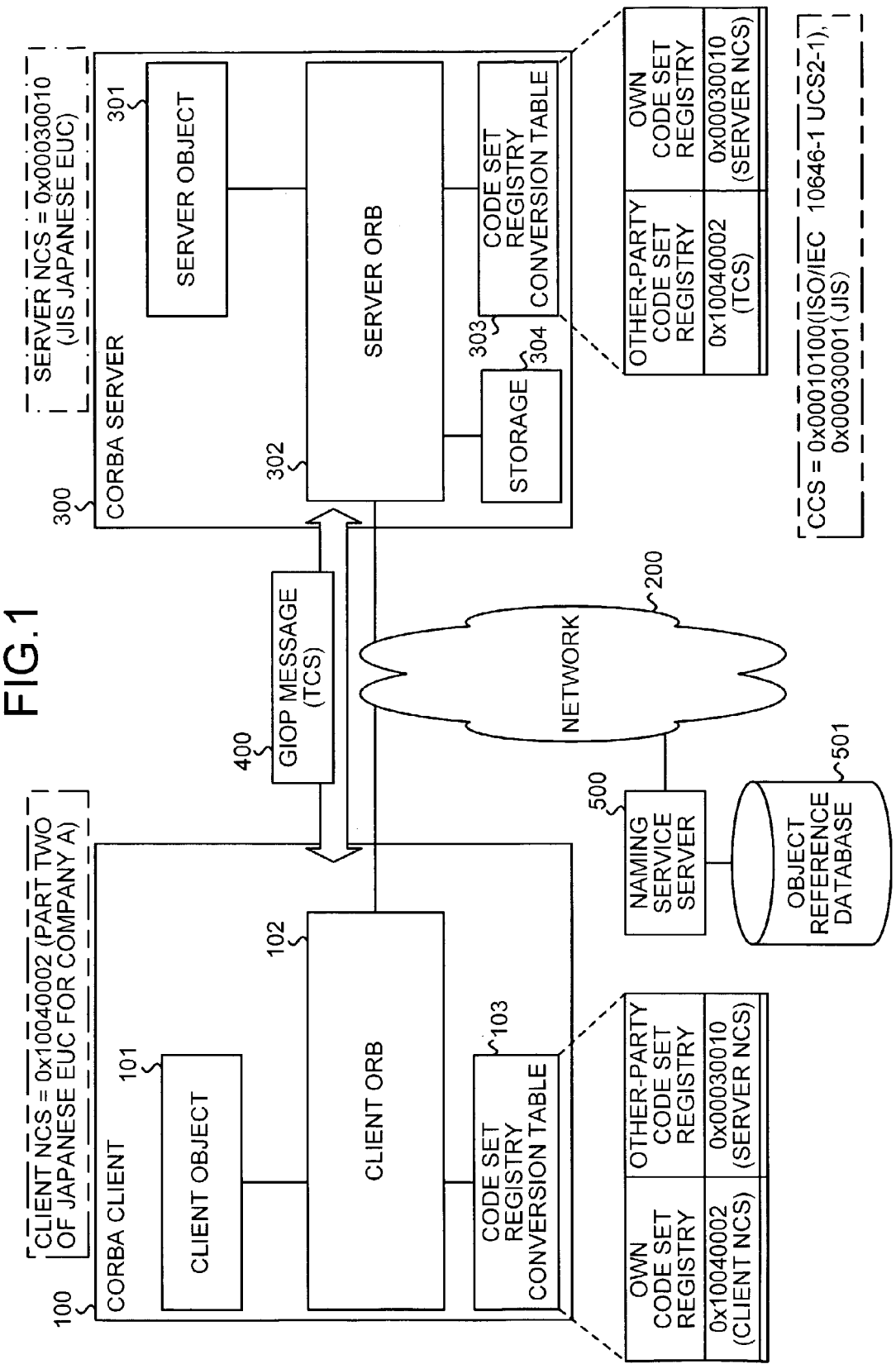
FIG. 1 is a block diagram of configuration of a client-server system according to one embodiment of the present invention.

FIG. 1 is a block diagram of configuration of a client-server system according to an embodiment of the present invention. FIG. 1 shows the client-server system that is based on CORBA. A CORBA client 100 is connected to a CORBA server 300 and a naming service server 500 via a network 200. The CORBA client 100 has a client object 101, a client ORB 102, and a code set registry conversion table 103.

The client object 101 is an application program or the like that is used to execute various kinds of processing and communications. The client object 101 uses the vendor specific character code set 0x10040002 (the part two of Japanese EUC for company A) (refer to FIG. 14) for the client NCS. As this 0x10040002 (the part two of Japanese EUC for company A) is a vendor specific character code set, this is not registered in the object reference that is stored in an object reference database 501.

The client ORB 102 is a software bus that intermediates between the client object 101 and the server object 301 in their communications. The client ORB 102 accesses the naming service server 500 and the CORBA server 300 via the network 200.

Figure 15:
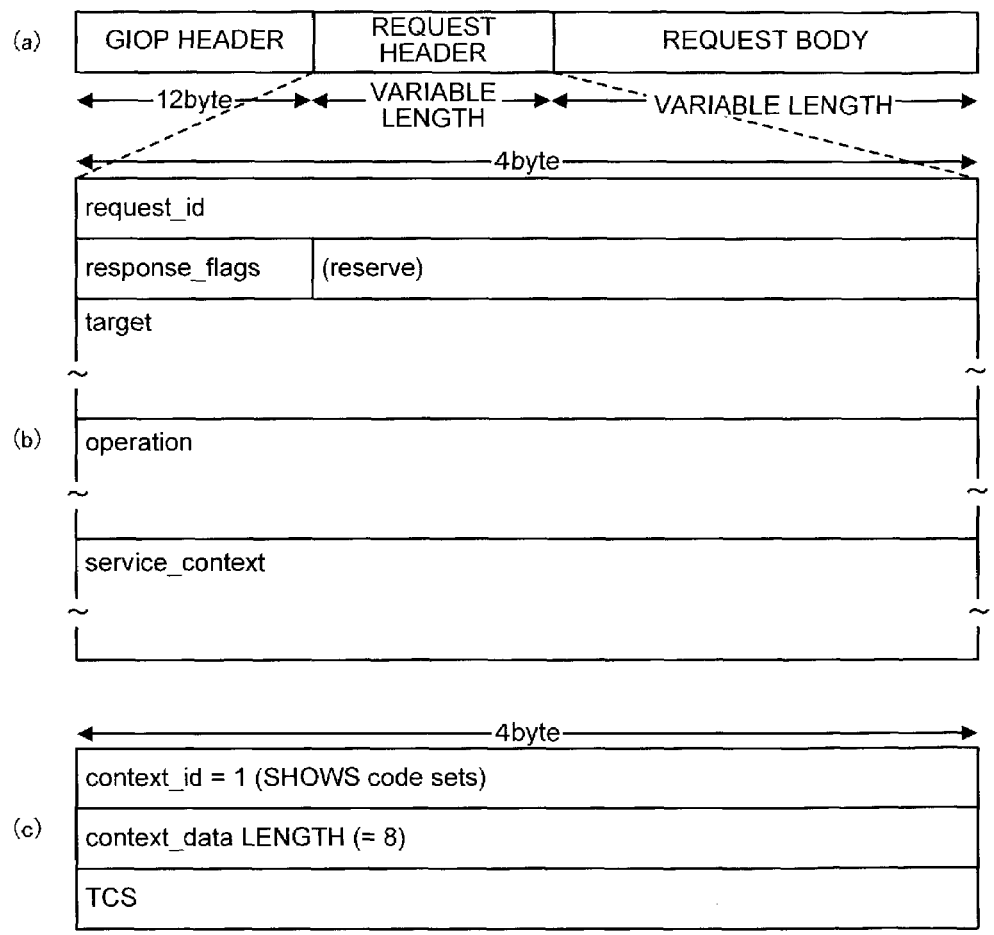
FIG. 15 shows formats of GIOP messages.

The client ORB 102 executes a processing of determining a TCS, and sets the TCS to a GIOP message 400. The TCS is a neutral code set registry (i.e., a character code set) that does not depend on a specific operating system, a specific program language, or a specific architecture, as described above. The GIOP message 400 has the format shown in FIG. 15.

The code set registry conversion table 103 is a table that enables the CORBA client 100 and the other party (for example, the CORBA server 300) to use between them vendor specific character code sets that are not registered in the object reference.

Specifically, the code set registry conversion table 103 is a table that is used to convert codes between the own code set registry and the other-party code set registry. The own code set registry is a client NCS. In this case, the own code set registry is 0x10040002 (the part two of Japanese EUC for company A). The other-party code set registry is a server NCS or a CCS to be described later, which is 0x00030010 (a server NCS) or the like.

Conventionally, the CORBA server 300 recognizes the vendor specific character code set 0x10040002 (the part two of Japanese EUC for company A) as an unknown character code set, and therefore, the CORBA server 300 cannot convert the character code.

On the other hand, the CORBA server 300 may be made to carry out the character code conversion by relating 0x10040002 (the part two of Japanese EUC for company A) to the server NCS or the CCS that the CORBA server 300 can use, based oh the code set registry conversion table 103.

However, in the code set registry conversion table 103, it is necessary that a range of the own code set registry (i.e., the character code set) is partially common to a range of the other-party code set registry (i.e., the character code set).

Figure 2:
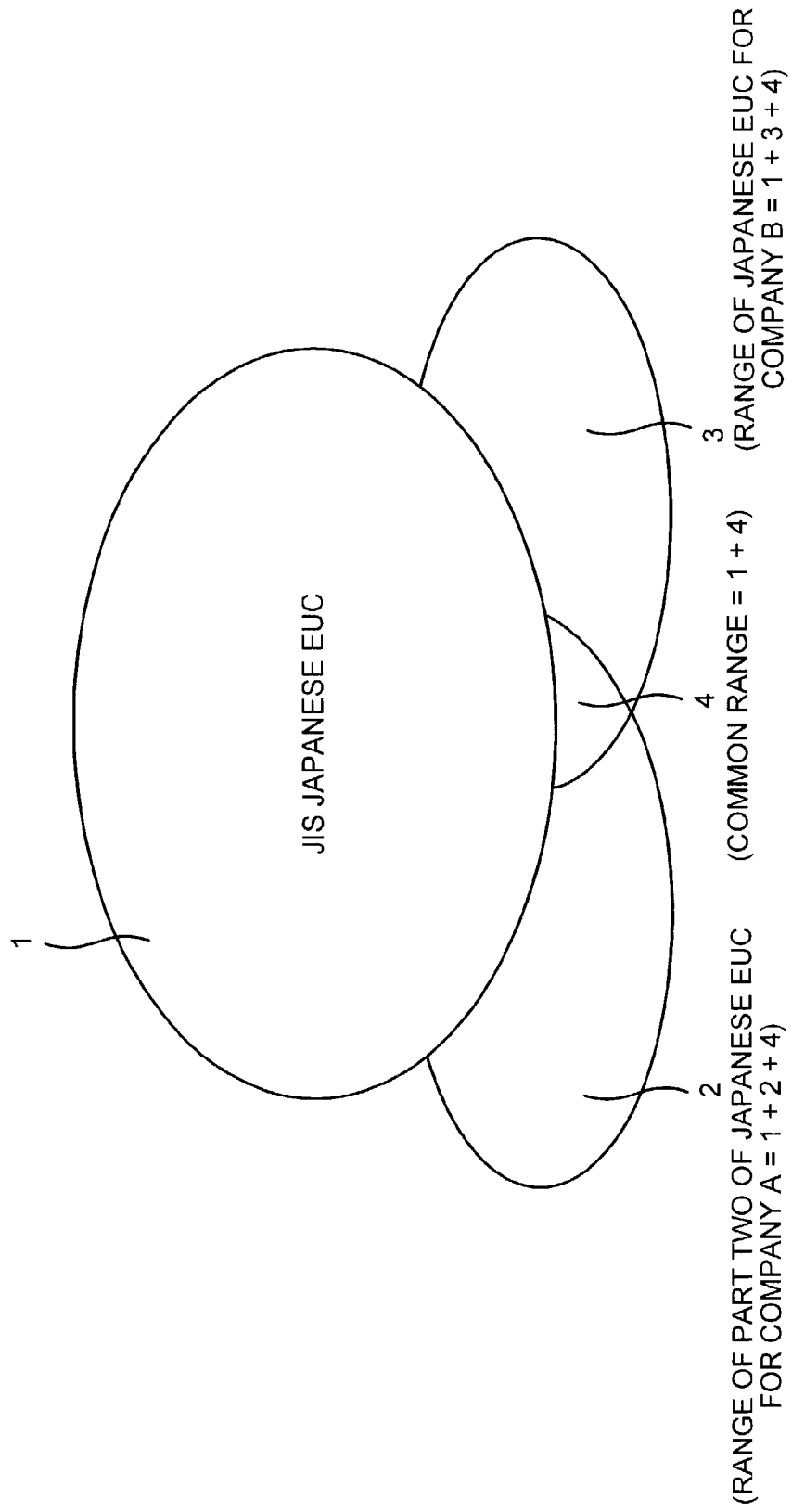
FIG. 2 is a diagram that shows an operation principle of the client-server system according to the embodiment.

As shown in FIG. 2, a range 1 is a character code range of the JIS Japanese EUC. This JIS Japanese EUC corresponds to the other-party code set registry (0x00030010 (a server NCS)) in the code set registry conversion table 103 shown in FIG. 1.

The part two of the Japanese EUC for company A shown in FIG. 2 is an addition of character codes (a range two and a range four) corresponding to characters (i.e., machine-type dependent characters) that are necessary for company A (a vendor), to the JIS Japanese EUC as a standard character code set as the base. Therefore, the range of the part two of the Japanese EUC for company A is the range 1 (the JIS Japanese EUC), the range two, and the range four.

In other words, the part two of the Japanese EUC for company A (the vendor specific character code set) and the JIS Japanese EUC (the standard character code set) are common to each other in the range 1. Their character codes corresponding to the range 1 coincide with each other.

Similarly, the Japanese EUC for company B shown in FIG. 2 is an addition of character codes (a range three and the range four) corresponding to characters (i.e., machine-type dependent characters) that are necessary for company B (a vendor), to the JIS Japanese EUC as a standard character code set as the base. Therefore, the range of the Japanese EUC for company B is the range 1 (the JIS Japanese EUC), the range three, and the range four.

In other words, the Japanese EUC for company B (the vendor specific character code set) and the JIS Japanese EUC (the standard character code set) are common to each other in the range 1. Their character codes corresponding to the range 1 coincide with each other.

The part two of the Japanese EUC for company A (the vendor specific character code set) and the Japanese EUC for company B (the vendor specific character code set) are common to each other in the range 1 and the range four. Their character codes corresponding to the range 1 and the range four coincide with each other.

The own code set registry (the character code set) and the other-party code set registry (the character code set) that have mutually common ranges (character codes) have compatibility based on the above ranges (character codes). By utilizing such compatibility, it is made possible to convert a character code that cannot be converted in the past.

Referring back to FIG. 1, the CORBA server 300 comprises the server object 301, the server ORB 302, the code set registry conversion table 303, and the storage 304. The server object 301 is an application program or the like that is used to execute various kinds of processing and communications.

The server ORB 302 is a software bus that is accessed from the client ORB 102 via the network 200 and that intermediates between the client object 101 and the server object 301 in their communications.

The server ORB 302 also has a function of communicating with the client ORB 102 via the network 200, by using the neutral stream-format data (i.e., the GIOP message 400) that does not depend on a specific operating system, a specific program language, or a specific architecture.

The code set registry conversion table 303 is a table that enables the CORBA server 300 and the other party (i.e., the CORBA client 100 shown in the drawing in this case) to use between them vendor specific character code sets that are not registered in the object reference.

Specifically, the code set registry conversion table 303 is a table that is used to convert codes between the own code set registry and the other-party code set registry. The other-party code set registry is a TCS. In this case, the other-party code set registry is 0x10040002 (the part two of Japanese EUC for company A). The own code set registry is a server NCS or a CCS.

The server NCS is a code set registry (i.e., a character code set) that is used in the server object 301. The CCS is a code set registry (i.e., a character code set) that can be converted between the server NCS and the CCS.

The server NCS is 0x00030010 (the JIS Japanese EUC) corresponding to the standard character code set. Moreover, CCS are 0x00010100 (ISO/IEC 10646-1 UCS2-1), and 0x00030001 (JIS), corresponding to the standard character code set.

When the server ORB 302 receives the GIOP message 400 or the like that is transmitted from the client ORB 102 of the CORBA client 100, a request ID and a TCS (i.e., the other-party code set registry) included in the GIOP message 400 or the like are stored into the storage 304.

The naming service server 500 provides the CORBA client 100 with a CORBA naming service. The naming service server 500 manages the server object 301 based on a name.

Based on such naming service, when accessing the server object 301, the client object 101 can access the server object 301 based on a name of the server object 301 instead of a position of the server object 301. Therefore, the client object 101 does not need to be conscious about a physical position of the server object 301.

Specifically, when there is an enquiry from the client object 101, the naming service server 500 reads the object reference from the object reference database 501, and returns this object reference to the client object 101, thereby to provide a naming service.

The object reference is information for uniquely identifying the server object 301 based on a name. Specifically, the object reference consists of information including an IOR header, an ID, a host name (i.e., an IP address), a PORT number, an object key, the server NCS, and the CCS.

Figure 4:
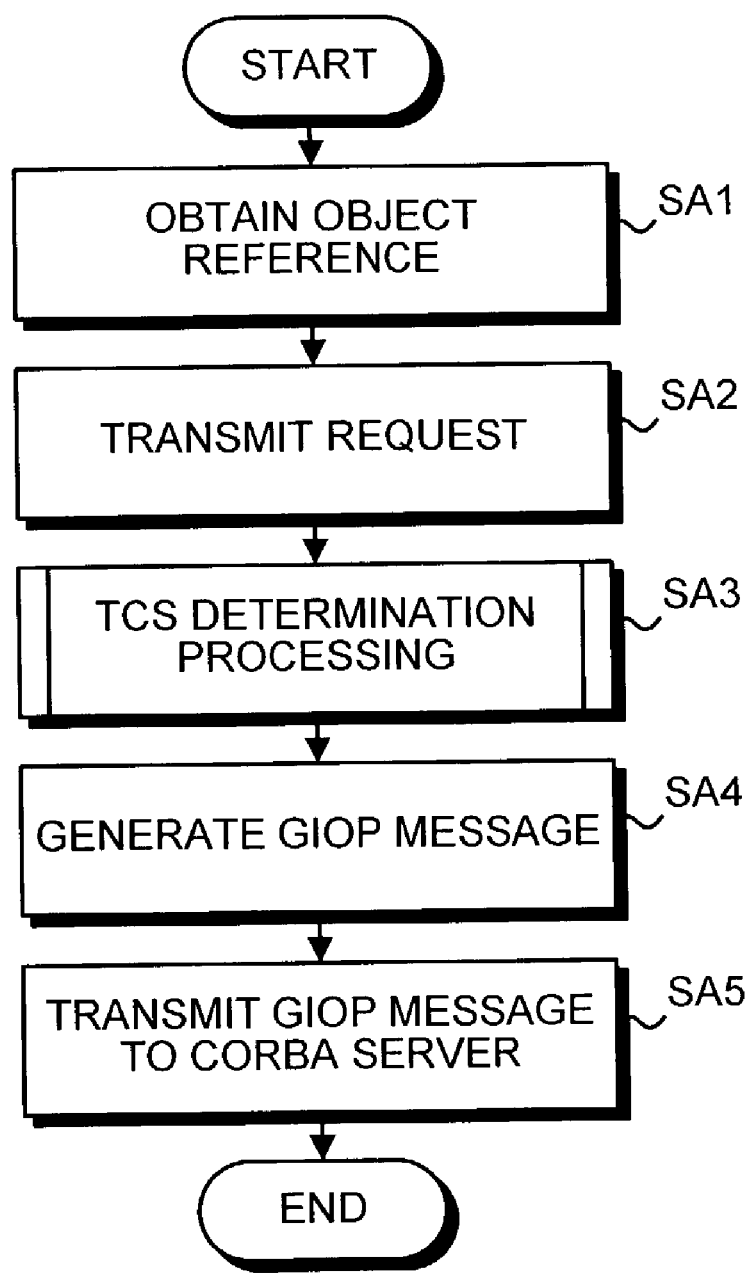
FIG. 4 is a flowchart that shows a request transmission operation performed by the CORBA client 100 shown in FIG. 3.
Figure 5:
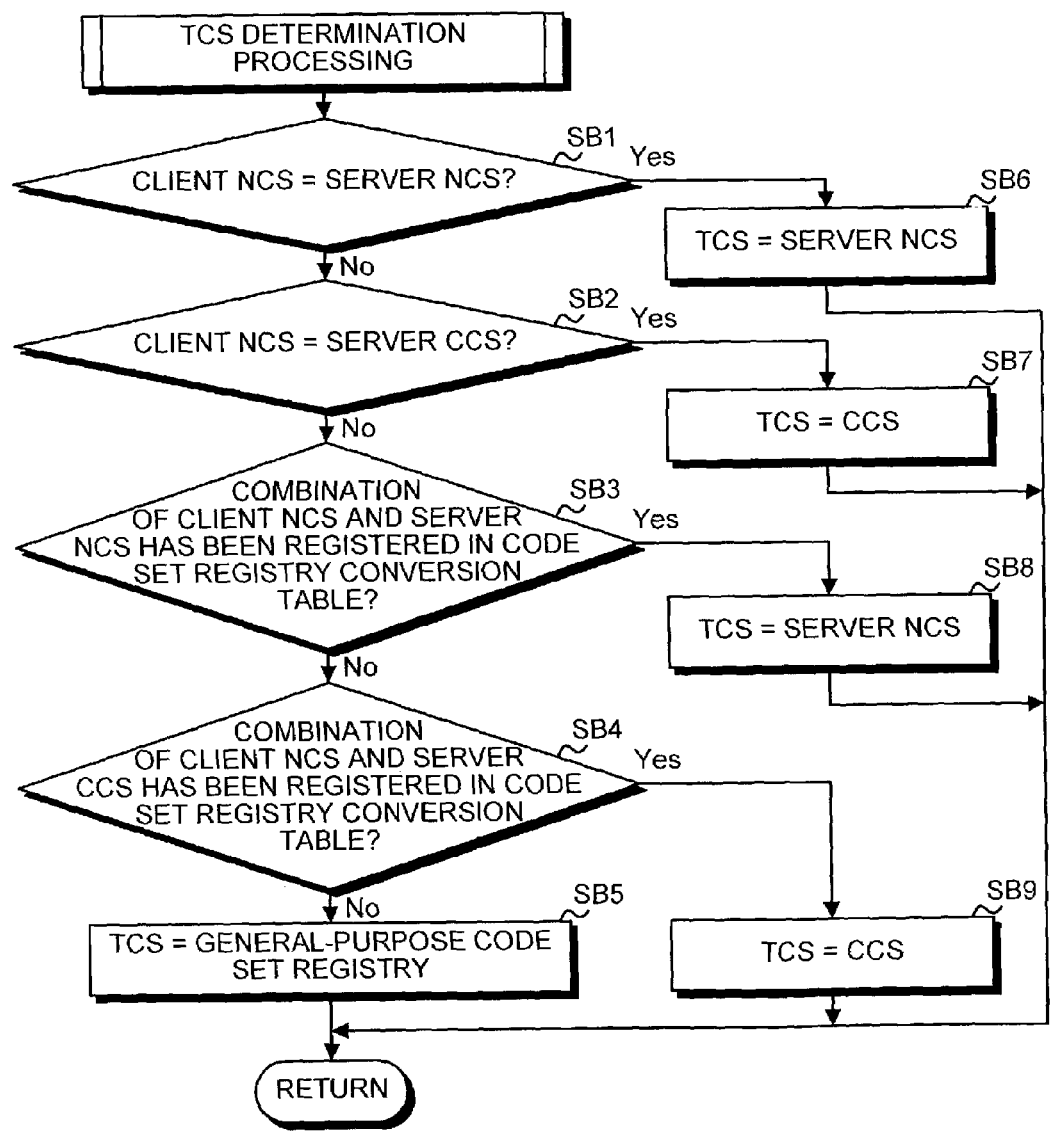
FIG. 5 is a flowchart of a TCS determination processing.

A request transmission operation performed by the CORBA client 100 will be explained with reference to FIG. 3 to FIG. 5.

Figure 3:
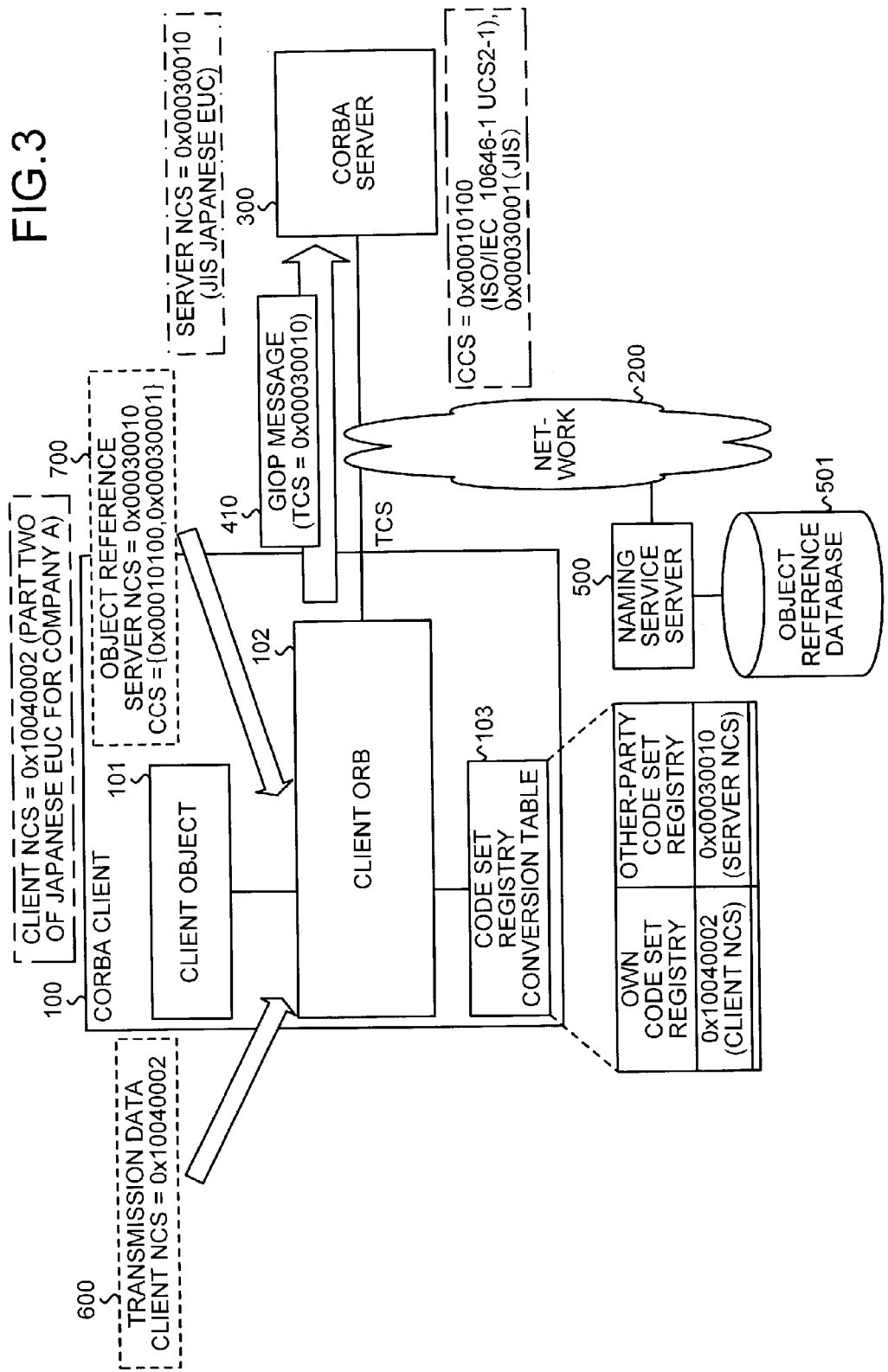
FIG. 3 is a block diagram of a request transmission operation performed by a CORBA client 100 shown in FIG. 1.

FIG. 3 is a block diagram that explains about the request transmission operation performed by the CORBA client 100 shown in FIG. 1. FIG. 4 is a flowchart that explains about the request transmission operation performed by the CORBA client 100 shown in FIG. 3.

At step SA1 (see FIG. 4), the client object 101 of the CORBA client 100 accesses the naming service server 500 via the client ORB 102 and the network 200, and obtains an object reference 700 (i.e., the server NCS (=0x00030010) and the CCS (=0x00010100, and 0x00030001) corresponding to the server object 301 shown in FIG. 3.

At step SA2, the client object 101 delivers the object reference 700, and transmission data 600 corresponding to the client NCS (0x10040002 (the part two of the Japanese EUC for company A)), to the client ORB 102, and issues a transmission request.

At step SA3, the client ORB 102 compares the client NCS (0x10040002 (the part two of the Japanese EUC for company A)) with the server NCS (0x00030010 (the JIS Japanese EUC) and the CCS (0x00010100 (ISO/IEC 10646-1 UCS2-1), and 0x00030001 (JIS)) that are included in the transmission data 600, and the code set registry conversion table 103. Based on a result of the comparison, the client ORB 102 executes a TCS determination processing for determining a TCS.

The TCS determination processing will be explained with reference to FIG. 5. At step SB1, the client ORB 102 decides whether the client NCS (0x10040002 (the part two of the Japanese EUC for company A)) coincides with the server NCS (0x00030010 (the JIS Japanese EUC). In this example, the client ORB 102 sets "No" as a result of the decision made.

When a result of the decision made at step SB1 is "Yes", the client ORB 102 determines at step SB6 that the server NCS is the TCS.

At step SB2, the client ORB 102 decides whether the client NCS (0x10040002 (the part two of the Japanese EUC for company A)) coincides with the CCS (0x00010100 (ISO/IEC 10646-1 UCS2-1), and 0x00030001 (JIS)). In this example, the client ORB 102 sets "No" as a result of the decision made.

When a result of the decision made at step SB2 is "Yes", the client ORB 102 determines at step SB7 that the CCS is the TCS.

At step SB3, the client ORB 102 decides whether a combination of the client NCS (0x10040002 (the part two of the Japanese EUC for company A)) as the own code set registry and the server NCS (0x00030010 (the JIS Japanese EUC) as the other-party code set registry has been registered in the code set registry conversion table 103. In this example, the client ORB 102 sets "Yes" as a result of the decision made.

At step SB8, the client ORB 102 determines that the server NCS (0x00030010 (the JIS Japanese EUC) as the other-party code set registry that is registered in the code set registry conversion table 103 is the TCS.

On the other hand, when a result of the decision made at step SB3 is "No", the client ORB 102 decides at step SB4 whether a combination of the client NCS (0x10040002 (the part two of the Japanese EUC for company A)) as the own code set registry and the CCS (0x00010100 (ISO/IEC 10646-1 UCS2-1), or 0x00030001 (JIS)) as the other-party code set registry has been registered in the code set registry conversion table 103.

When a result of the decision made at step SB4 is "Yes", the client ORB 102 determines at step SB9 that the CCS as the other-party code set registry that is registered in the code set registry conversion table 103 is the TCS.

On the other hand, when a result of the decision made at step SB4 is "No", the client ORB 102 decides at step SB5 that a general-purpose code set registry is the TCS. This general-purpose code set registry is for determining a TCS that may cause the occurrence of an error in the CORBA server 300. For example, the general-purpose code set registry is 0x00010001 (ISO08859-1 (Latin-1)).

Referring back to FIG. 4, at step SA4, the client ORB 102 sets the TCS determined in the TCS determination processing and the transmission data 600 to a GIOP message 410, thereby to generate the GIOP message 410 (a request ID (request_id, refer to FIG. 15B)=m). At step SA5, the client ORB 102 transmits the GIOP message 410 to the CORBA server 300 (the server ORB 302) via the network 200.

The server ORB 302 receives the GIOP message 410. When the TCS that is set to the GIOP message 410 coincides with the server NCS, the server ORB 302 sets the TCS as the server TCS, and delivers the reception data (i.e., the received transmission data) and the server NCS to the server object 301.

On the other hand, when the TCS that is set to the GIOP message 410 coincides with the CCS, the server ORB 302 converts the TCS (the CCS) into the server NCS, and delivers the reception data and the server NCS to the server object 301.

A response receiving operation performed by the CORBA client 100 will be explained with reference to FIG. 6 and FIG. 7.

Figure 6:
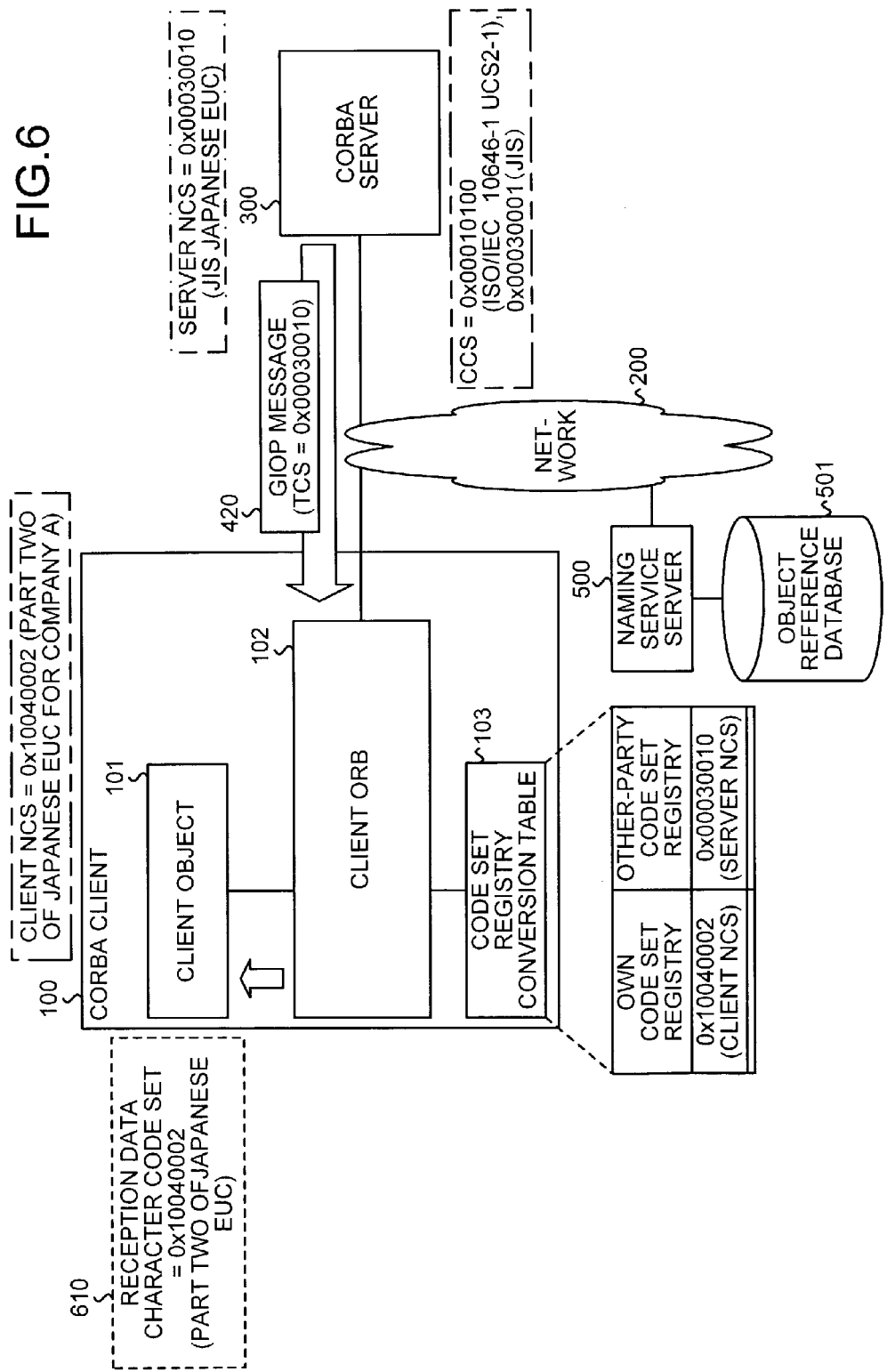
FIG. 6 is a block diagram of a response receiving operation performed by the CORBA client 100 shown in FIG. 1.
Figure 7:
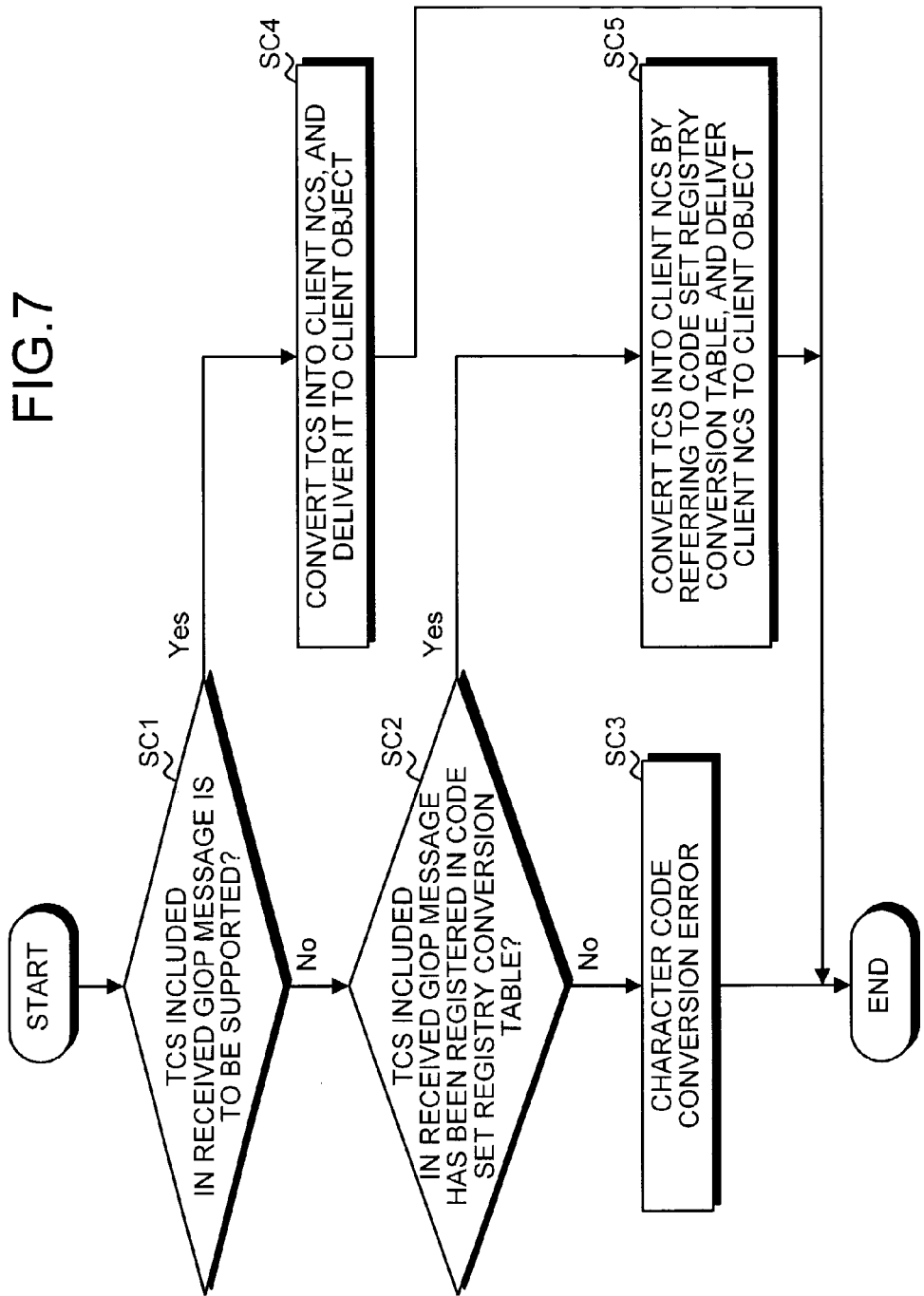
FIG. 7 is a flowchart that shows a character code set conversion processing performed by the CORBA client 100 shown in FIG. 6 when the CORBA client 100 receives a response.

FIG. 6 is a block diagram that explains about the response receiving operation performed by the CORBA client 100 shown in FIG. 1. FIG. 7 is a flowchart that explains about a character code set conversion processing performed by the CORBA client 100 shown in FIG. 6 when the CORBA client 100 receives a response.

The client ORB 102 receives a GIOP message 420 that is transmitted from the server ORB 302 of the CORBA server 300, via the network 200. At step SC1 (see FIG. 7), the client ORB 102 decides whether the TCS included in the received GIOP message 420 is to be supported (i.e., whether the TCS can be directly converted).

The GIOP message 420 is a response from the CORBA server 300 (i.e., the server ORB 302) in reply to the GIOP message 410 (refer to FIG. 3). In the example shown in FIG. 6, the TCS (0x00030010 (JIS Japanese EUC)) is set to the GIOP message 420.

When a result of the decision made at step SC1 is "Yes", at step SC4, the client ORB 102 directly converts the TCS that is set to the GIOP message 420 into the client NCS, and delivers reception data 610 corresponding to the client NCS to the client object 101.

On the other hand, when a result of the decision made at step SC1 is "No", the client ORB 102 decides at step SC2 whether the TCS (0x00030010 (JIS Japanese EUC)) that is included in the received GIOP message 420 has been registered in the other-party code set registry in the code set registry conversion table 103.

When a result of the decision made at step SC2 is "Yes", at step SC5, the client ORB 102 refers to the code set registry conversion table 103, and confirms the own code set registry (i.e., the client NCS) corresponding to the other-party code set registry. In the example shown in FIG. 6, the own code set registry (i.e., the client NCS) is 0x10040002 (the part two of Japanese EUC for company A). The client ORB 102 converts the TCS (0x00030010 (JIS Japanese EUC)) into the client NCS (0x10040002) (the part two of Japanese EUC for company A)), and delivers the reception data 610 corresponding to this client NCS to the client object 101.

On the other hand, when a result of the decision made at step SC2 is "No", the client ORB 102 cannot convert the character code, and therefore, at step SC3, a character code conversion error occurs.

A request receiving operation performed by the CORBA server 300 shown in FIG. 1 will be explained with reference to FIG. 8 and FIG. 9.

Figure 8:
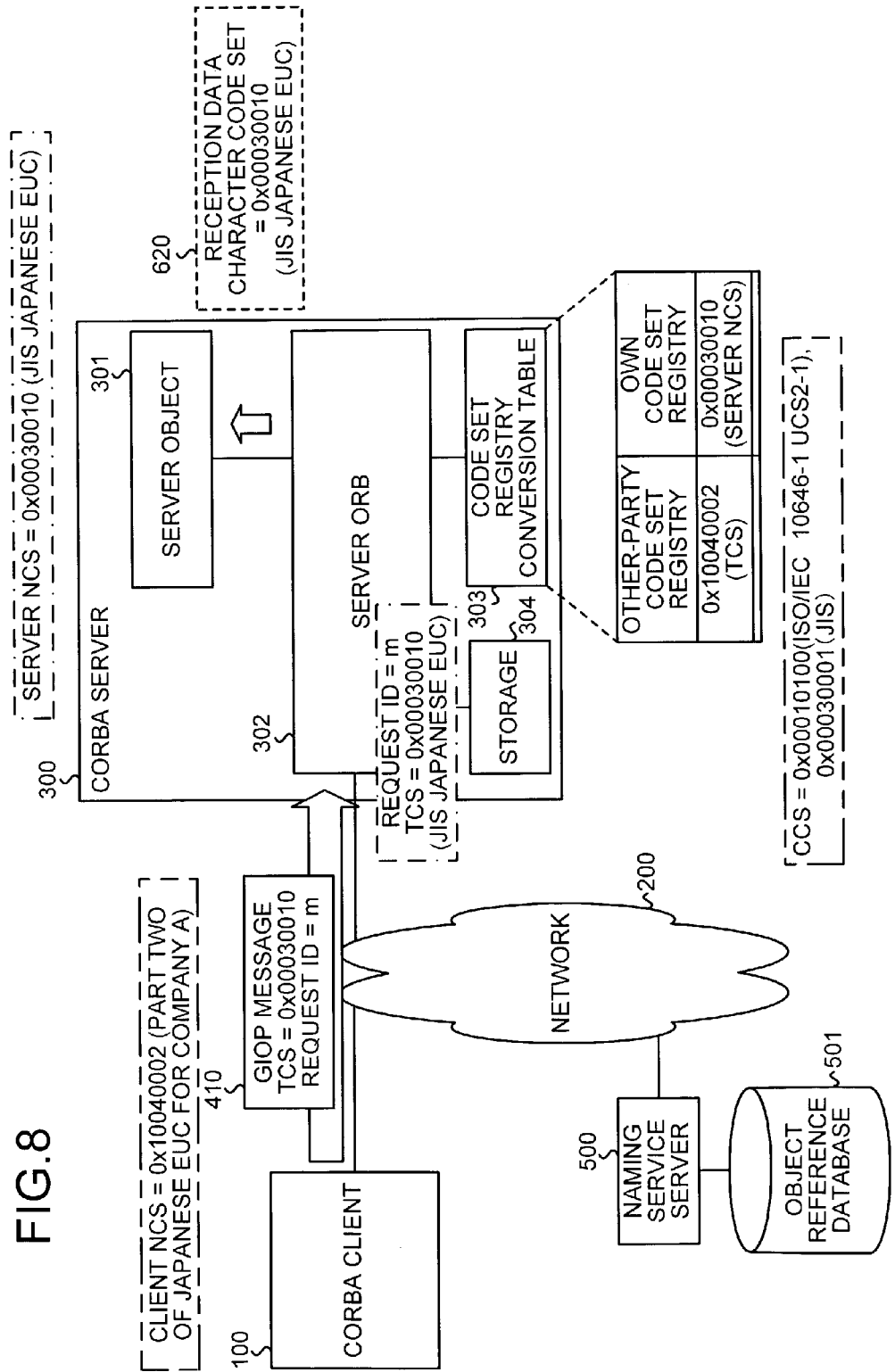
FIG. 8 is a block diagram of a TCS determination processing performed by a CORBA server 300 shown in FIG. 1 when the CORBA server 300 receives a request.
Figure 9:
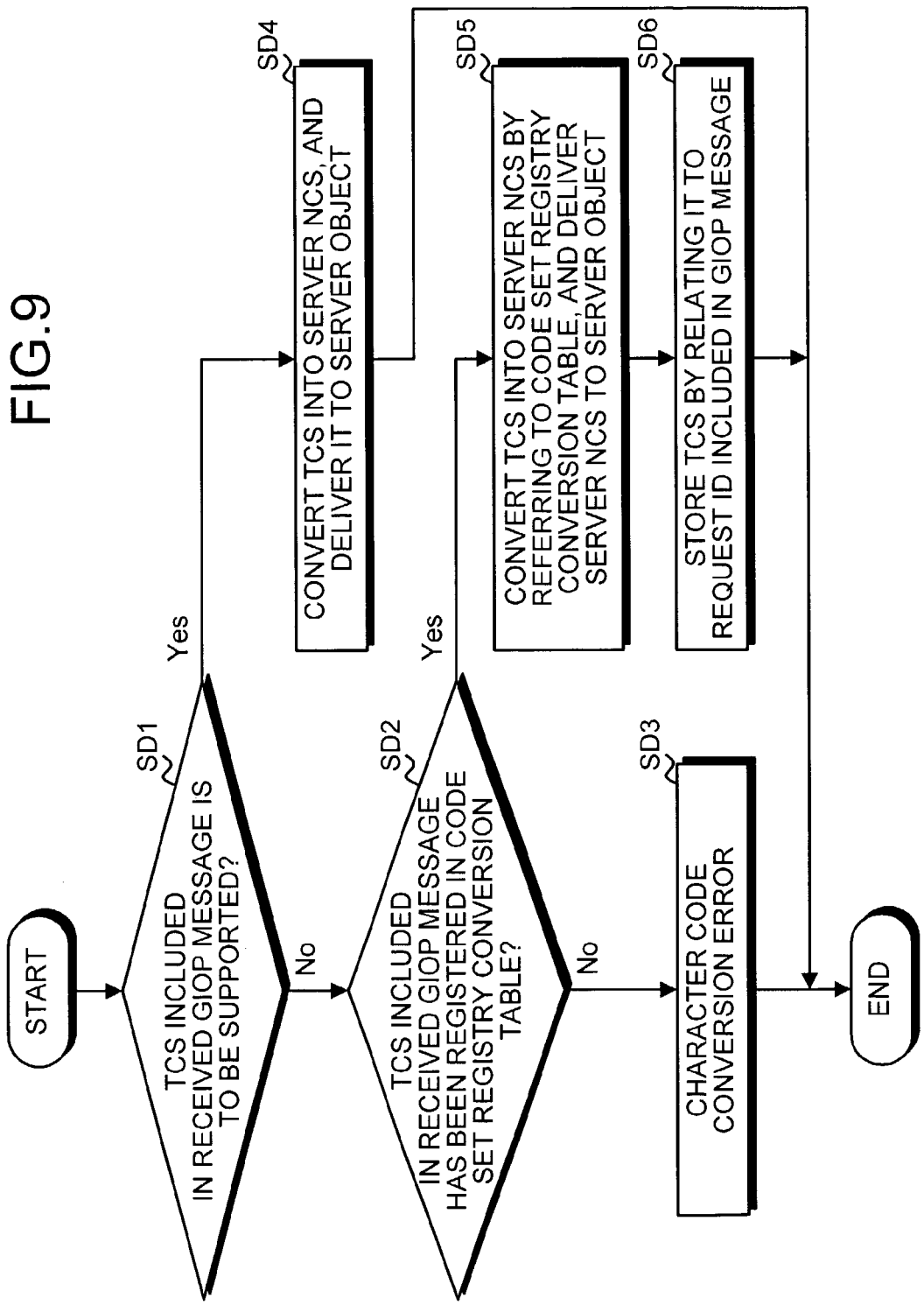
FIG. 9 is a flowchart of the TCS determination processing performed by the CORBA server 300 shown in FIG. 8 when the CORBA server 300 receives a request.

FIG. 8 is a block diagram that explains about a TCS determination processing performed by the CORBA server 300 shown in FIG. 1 when the CORBA server 300 receives a request. FIG. 9 is a flowchart that explains about the TCS determination processing performed by the CORBA server 300 shown in FIG. 8 when the CORBA server 300 receives a request.

The server ORB 302 receives the GIOP message 410 that is transmitted from the client ORB 102 (refer to FIG. 3) of the CORBA client 100, via the network 200. At step SD1 of the flowchart shown in FIG. 9, the server ORB 302 decides whether the TCP included in the received GIOP message 410 is to be supported (i.e., whether the TCS can be directly converted).

The client ORB 102 sets the TCS (0x00030010 (JIS Japanese EUC)) and the request ID(=m) in the GIOP message 410.

When a result of the decision made at step SD1 is "Yes", at step SD4, the server ORB 302 directly converts the TCS that is set to the GIOP message 410 into the server NCS, and delivers reception data 620 corresponding to the server NCS to the server object 301.

On the other hand, when a result of the decision made at step SD1 is "No", the server ORB 302 decides at step SD2 whether the TCS that is included in the received GIOP message 410 has been registered in the other-party code set registry in the code set registry conversion table 303.

When a result of the decision made at step SD2 is "Yes", at step SD5, the server ORB 302 refers to the code set registry conversion table 303, and confirms the own code set registry (i.e., the server NCS) corresponding to the other-party code set registry.

The server ORB 302 converts the TCS into the server NCS, and delivers the reception data 620 corresponding to this server NCS to the server object 301. At step SD6, the server ORB 302 stores the TCS into the storage 304 by relating the TCS to the request ID that is included in the received GIOP message 410.

On the other hand, when a result of the decision made at step SD2 is "No", the server ORB 302 cannot convert the character code, and therefore, at step SD3, a character code conversion error occurs.

A TCS determination processing performed by the CORBA server 300 shown in FIG. 1 when the CORBA server 300 transmits a response will be explained with reference to FIG. 10 and FIG. 11.

Figure 10:
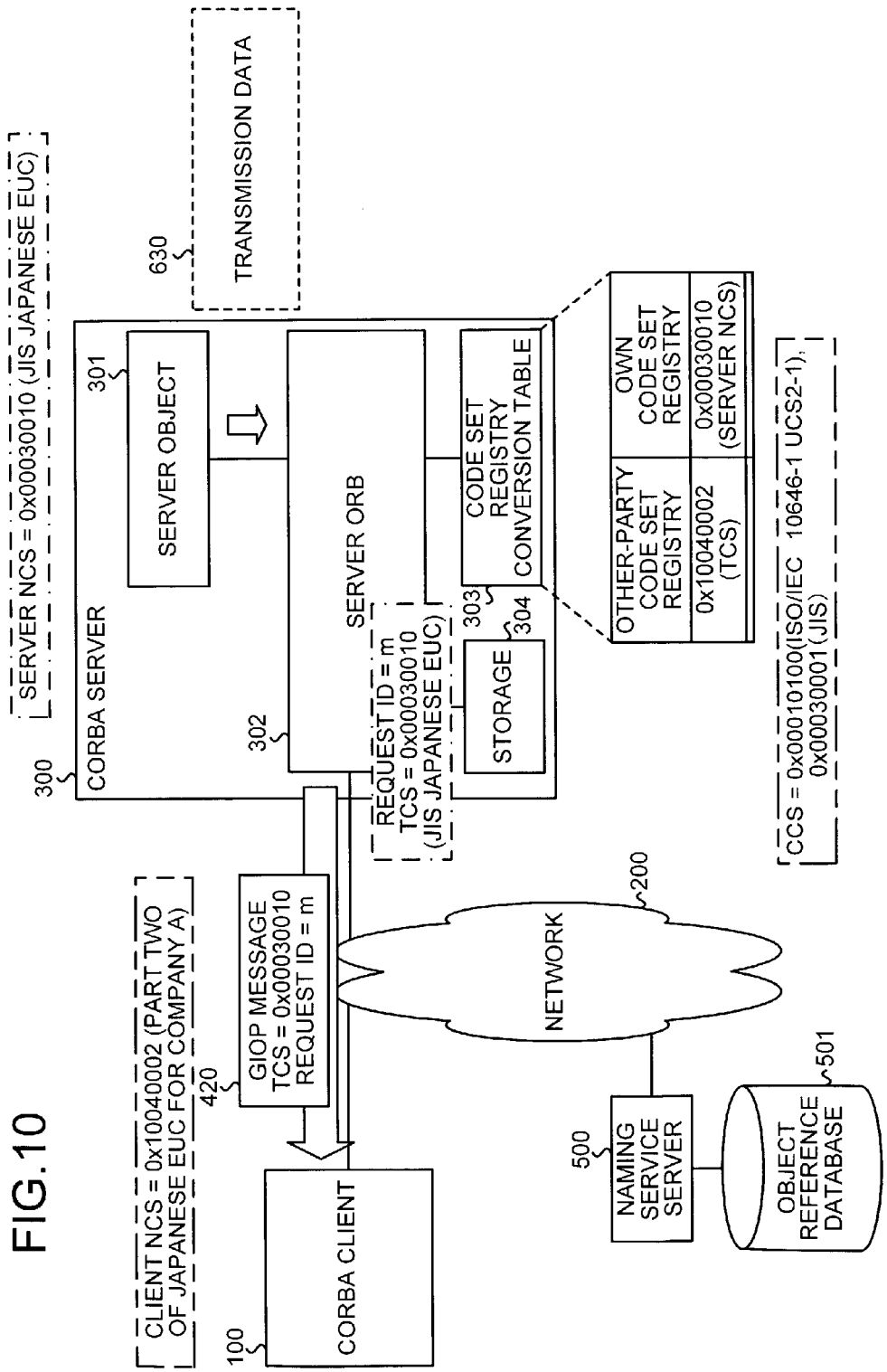
FIG. 10 is a block diagram of a TCS setting processing performed by the CORBA server 300 shown in FIG. 1 when the CORBA server 300 transmits a response.
Figure 11:
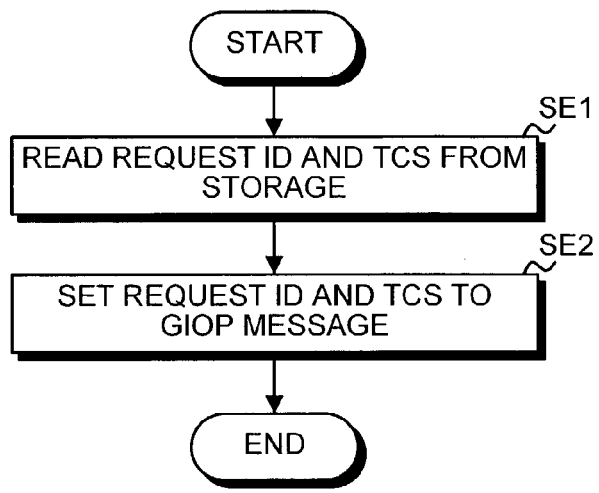
FIG. 11 is a flowchart of the TCS setting processing performed by the CORBA server 300 shown in FIG. 10 when the CORBA server 300 transmits a response.

FIG. 10 is a block diagram that explains about a TCS setting processing performed by the CORBA server 300 shown in FIG. 1 when the CORBA server 300 transmits a responce. FIG. 11 is a flowchart that explains about the TCS setting processing performed by the CORBA server 300 shown in FIG. 10 when the CORBA server 300 transmits a response.

The server object 301 receives the GIOP message 410 shown in FIG. 8, and performs a response transmission operation of transmitting the GIOP message 420 to the CORBA client 100 (i.e., the client ORB 102) in response to the GIOP message 410.

In other words, the server object 301 delivers the transmission data 630 to the server ORB 302. At step SE1 of the flowchart shown in FIG. 11, the server ORB 302 reads the request ID and the TCS stored at step SD6 (refer to FIG. 9), from the storage 304.

At step SE2, the server ORB 302 sets the request ID and the TCS to the GIOP message 420, and transmits the transmission data 630 to the client ORB 102 of the CORBA client 100 as the GIOP message 420.

As explained above, as shown in FIG. 3, the CORBA client 100 obtains the server NCS and the CCS (i.e., server character information) that the CORBA server 300 as a transmission destination can use, from the object reference 700. The CORBA client 100 refers to the code set registry conversion table 103 that shows a relationship between the own code set registry (i.e., client character code information) that the CORBA client 100 can use and that is not registered in the object reference, and the other-party code set registry (i.e., server character code information). The CORBA client 100 converts the client character code information into the server character code information. Then, the CORBA client 100 sets the other-party code set registry (i.e., server character code information) to the GIOP message 410 that is transmitted from the CORBA client 100 to the CORBA server 300. Therefore, it is possible to carry out a character code information conversion using the character code information that is not registered in the object reference.

Furthermore, as shown in FIG. 6, the CORBA client 100 converts the TCS (i.e., server character code information) that the CORBA server 300 sets, into the own code set registry (i.e., client character code information), based on the GIOP message 420 that is received from the CORBA server 300. Therefore, it is possible to carry out a character code information conversion using the character code information that is not registered in the object reference.

Furthermore, as shown in FIG. 8, the CORBA server 300 obtains the TCS (i.e., client character code information) that the CORBA client 100 sets, based on the GIOP message 410 that is received from the CORBA client 100. The CORBA server 300 refers to the code set registry conversion table 303 that shows a relationship between the other-party code set registry (i.e., client character code information) that the CORBA client 100 can use and that is not registered in the object reference, and the own code set registry (i.e., server character code information). The CORBA server 300 converts the other-party code set registry (i.e., client character code information) into the own code set registry (i.e., the server character code information). Therefore, it is possible to carry out a character code information conversion using the character code information that is not registered in the object reference.

Furthermore, the CORBA server 300 stores the TCS (i.e., client character code information) obtained from the GIOP message 410, which is received from the CORBA client 100 shown in FIG. 8, into the storage 304. When transmitting the response of the GIOP message 420 shown in FIG. 10, the CORBA server 300 sets the stored TCS (i.e., client character code information) to the GIOP message 420, and then transmits the GIOP message 420. Therefore, it is possible to carry out a character code information conversion using the character code information that is not registered in the object reference.

The client-server system according to the present invention is not limited to the one explained above. Any design alteration within a range not deviating from the gist of the present invention is included in the present invention.

For example, the above-explained embodiment may be modified as follows. A program for realizing the functions of the CORBA client 100 or the CORBA server 300 shown in FIG. 1 is recorded on a computer-readable recording medium 900 shown in FIG. 12. A computer 800 shown in FIG. 12 reads the program that is recorded on the recording medium 900, and executes the program, thereby to realize the functions.

Figure 12:
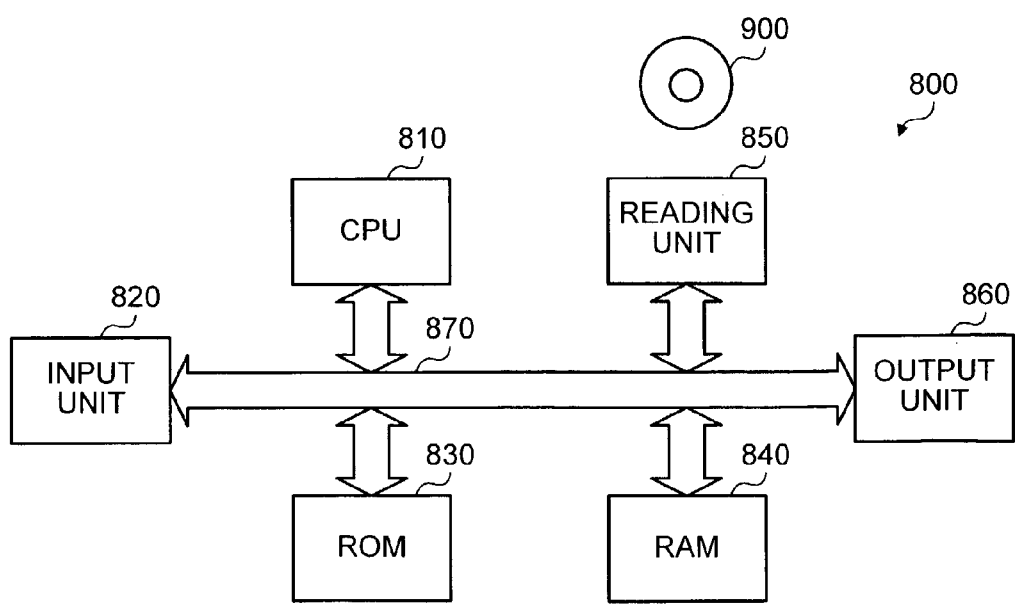
FIG. 12 is a block diagram of a modified configuration of a computer according to the embodiment.
Figure 13:
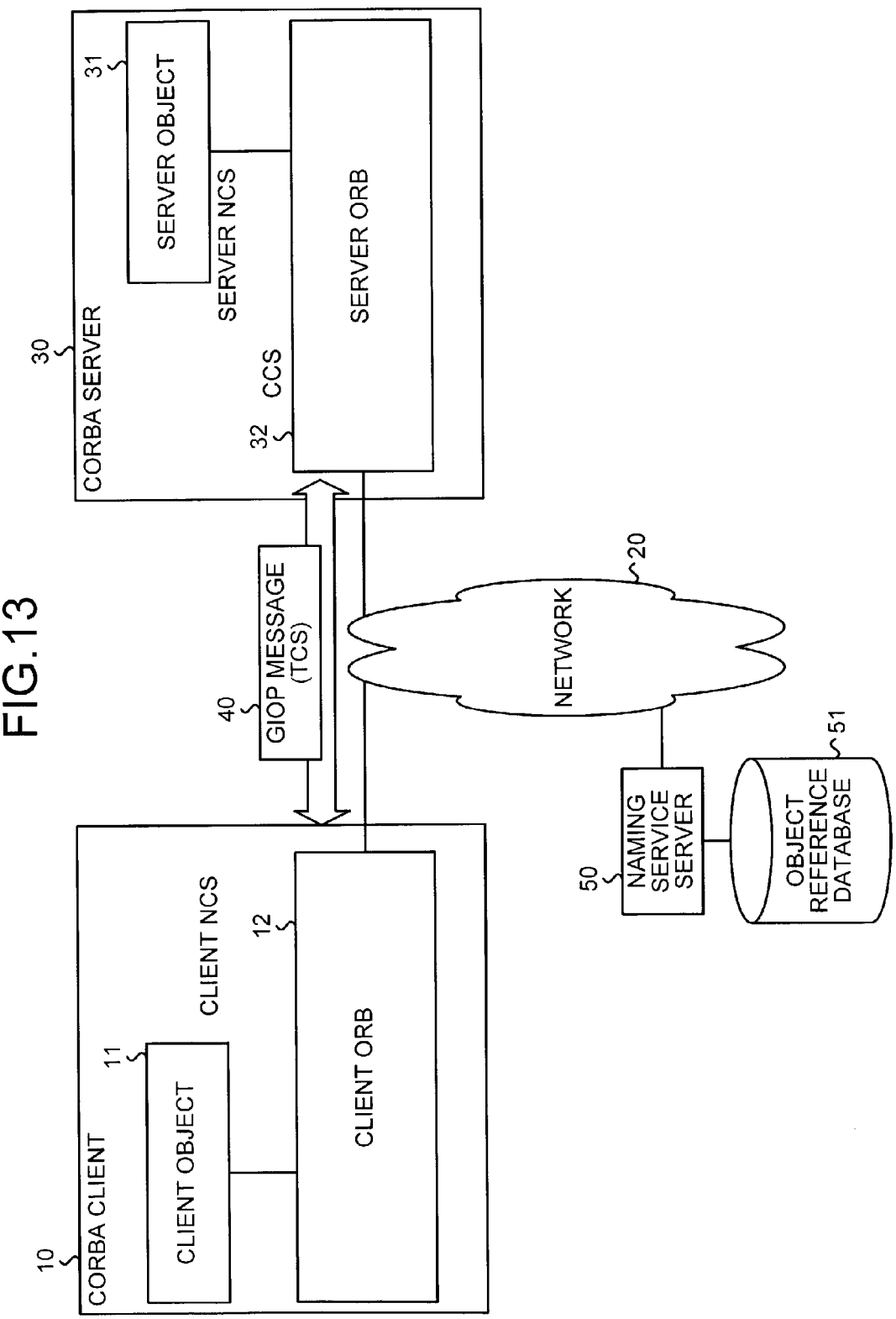
FIG. 13 is a block diagram of a conventional client-server system based on CORBA.

The computer 800 shown in FIG. 12 comprises a CPU (Central Processing Unit) 810 that executes the program, an input device 820 such as a keyboard and a mouse, a ROM (Read-Only Memory) 830 that stores various kinds of data, a RAM (Random Access Memory) 840 that stores operation parameters, a reading device 850 that reads the program from the recording medium 900, an output device 860 such as a display and a printer, and a bus 870 that connects between various sections of the devices.

The CPU 810 reads the program that is recorded in the recording medium via the reading device 850, and executes the program, thereby to realize the functions. The recording medium 900 includes an optical disk, a flexible disk, and a hard disk.

As explained above, according to the present invention, the CORBA client obtains the server character information that the CORBA server as a transmission destination can use, from the object reference. The CORBA client refers to the table that shows a relationship between the client character code information that the CORBA client can use and that is not registered in the object reference, and the server character code information. The CORBA client converts the client character code information into the server character code information. Then, the CORBA client sets the server character code information obtained based on the conversion to the communication data that is transmitted from the CORBA client to the CORBA server. Therefore, there is an effect that it is possible to carry out a character code information conversion using the character code information that is not registered in the object reference.

Furthermore, the CORBA client converts the server character code information that the CORBA server sets, into the client character code information, based on the communication data that is received from the CORBA server. Therefore, there is an effect that it is possible to carry out a character code information conversion using the character code information that is not registered in the object reference.

Furthermore, the CORBA server obtains the client character code information that the CORBA client sets, based on the communication data that is received from the CORBA client. The CORBA server refers to the table that shows a relationship between the client character code information that the CORBA client can use and that is not registered in the object reference, and the server character code information. The CORBA server converts the client character code information into the server character code information. Therefore, there is an effect that it is possible to carry out a character code information conversion using the character code information that is not registered in the object reference.

Moreover, the CORBA server stores the client character code information obtained from the communication data that is received from the CORBA client. When transmitting the response of the communication data, the CORBA server sets the stored client character code information to the communication data, and transmits the communication data to the CORBA client. Therefore, there is an effect that it is possible to carry out a character code information conversion using the character code information that is not registered in the object reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores a computer program for converting client character code on a CORBA client in a client-server system that is based on common object request broker architecture, the computer program making a computer execute:

obtaining a server native code set (NCS) that is a character code set used in a CORBA server as a transmission destination and a server conversion code set (CCS) that is a character code set convertible to the server NCS in the CORBA server, from an object reference;

determining a client NCS that is a character code set used by the CORBA client, as a transmission code set (TCS) that is a character code set for data transmitted to and received from the CORBA server, when the client NCS coincides with one of the server NCS and the server CCS;

determining one of the server NCS and the server CCS, the one corresponding to the client NCS, as the TCS, by referring to a conversion table storing corresponding relationship between character code sets when the client NCS does not coincide with the server NCS nor the server CCS; and setting the TCS determined to communication data that is transmitted from the CORBA client to the CORBA server.

2. The computer-readable recording medium according to claim 1, the computer program further making the computer execute;

obtaining a TCS set in the CORBA server, from communication data received from the CORBA server, wherein processing a character code set of the communication data as the client NCS when the TCS is not compatible with conversion to the client NCS and the TCS corresponds to the client NCS in the conversion table.

3. The computer-readable recording medium according to claim 1, wherein client character code information and server character code information have common character codes.

4. The computer-readable recording medium according to claim 1, wherein the conversion table includes corresponding relationship between partially common character code sets that have partially common corresponding relationship between their characters and character codes that is common between the partially common character code sets.

5. A CORBA client in a client-server system that is based on common object request broker architecture, the CORBA client comprising:

an obtaining unit that obtains a server native code set (NCS) that is a character code set used in a CORBA server as a transmission destination and a server conversion code set (CCS) that is a character code set convertible to the server NCS in the CORBA server, from an object reference;

a determining unit that determines a client NOS that is a character code set used by the CORBA client as a transmission code set (TCS) that is a character code set for data transmitted to and received from the CORBA server, when the client NCS coincides with one of the server NCS and the server CCS, and that determines one of the server NCS and the server CCS, the one corresponding to the client NCS, as the TCS by referring to a conversion table storing corresponding relationship between character code sets when the client NCS does not coincide with the server NCS nor the server CCS; and a unit that sets the TCS determined to communication data that is transmitted from the COBRA client to the COBRA server.

6. The CORBA client according to claim 5, wherein the conversion table includes corresponding relationship between partially common character code sets that have partially common corresponding relationship between their characters and character codes that is common between the partially common character code sets.

7. A method for conversion of a client character code employed in a CORBA client in a client-server system that is based on common object request broker architecture, the method comprising:

obtaining a server native code set (NCS) that is a character code set used in a CORBA server as a transmission destination and a server conversion code set (CCS) that is a character code set convertible to the server NCS in the CORBA server, from an object reference;

determining a client NCS that is a character code set used by the CORBA client, as a transmission code set (TCS) that is a character code set for data transmitted to and received from the CORBA server, when the client NCS coincides with one of the server NCS and the server CCS;

determining one of the server NCS and the server CCS, the one corresponding to the client NCS, as the TCS, by referring to a conversion table storing corresponding relationship between character code sets when the client NCS does not coincide with the server NCS nor the server CCS; and setting the TCS determined communication data that is transmitted from the CORBA client to the CORBA server.

8. The method according to claim 7, wherein the conversion table includes corresponding relationship between partially common character code sets that have partially common corresponding relationship between their characters and character codes that is common between the partially common character code sets.

* * * * *

UNITED STATES PATENT AND TRADEMARK OFFICE
CERTIFICATE OF CORRECTION

PATENT NO. : 7,493,360 B2
APPLICATION NO. : 10/460553
DATED : February 17, 2009
INVENTOR(S) : Naohiko Takamura It is certified that error appears in the above-identified patent and that said Letters Patent is hereby corrected as shown below:

In the Claims:

Col. 14, line 64, delete "NOS" and insert --NCS--.

Signed and Sealed this

Nineteenth Day of May, 2009

JOHN DOLL
*Acting Director of the United States Patent and Trademark Office*